(12) United States Patent
Weber

(10) Patent No.: US 6,176,072 B1
(45) Date of Patent: Jan. 23, 2001

(54) CHAIN LINK WITH INSERTABLE PARTITIONS

(75) Inventor: Willibald Weber, Netphen (DE)

(73) Assignee: Kabelschlepp GmbH, Siegen (DE)

(*) Notice: Under 35 U.S.C. 154(b), the term of this patent shall be extended for 0 days.

(21) Appl. No.: 09/355,608

(22) PCT Filed: Jan. 20, 1998

(86) PCT No.: PCT/EP98/00293

§ 371 Date: Jul. 30, 1999

§ 102(e) Date: Jul. 30, 1999

(87) PCT Pub. No.: WO98/34050

PCT Pub. Date: Aug. 6, 1998

(30) Foreign Application Priority Data

Jan. 30, 1997 (DE) .......................................... 197 034 101

(51) Int. Cl.[7] .................................................. F16G 13/16
(52) U.S. Cl. .................................................. 59/78.1; 248/49
(58) Field of Search ................... 59/78.1, 900; 248/49, 248/51

(56) References Cited

U.S. PATENT DOCUMENTS

| | | |
|---|---|---|
| 3,848,407 * | 11/1974 | Moritz ................................... 59/78.1 |
| 4,590,961 | 5/1986 | Schumann . |
| 4,626,233 * | 12/1986 | Moritz ................................... 59/78.1 |
| 4,962,639 | 10/1990 | Blasé . |
| 5,014,506 * | 5/1991 | Moritz ................................... 59/78.1 |
| 5,220,779 * | 6/1993 | Tatsuta et al. ........................ 59/78.1 |
| 5,711,144 * | 1/1998 | Pea ....................................... 59/78.1 |
| 5,768,882 * | 6/1998 | Weber et al. ........................ 59/78.1 |

FOREIGN PATENT DOCUMENTS

| | | |
|---|---|---|
| 34 08 912 | 8/1985 | (DE) . |
| 37 09 953 | 10/1988 | (DE) . |
| 91 02 121 | 5/1991 | (DE) . |

* cited by examiner

*Primary Examiner*—David Jones
(74) *Attorney, Agent, or Firm*—Alston & Bird

(57) ABSTRACT

The subject matter of the invention relates to a chain link of plastic, which is made in one piece from two opposite, spaced-apart chain side plates (1, 2) and a plate (3). The plate (3) comprises at least one profiled groove (8) extending substantially parallel to a chain link (1, 2). The profiled groove (8) is adapted for receiving a partition (6), which has in its one end section an engaging member (9) that is shaped to correspond with profiled groove (8).

18 Claims, 4 Drawing Sheets

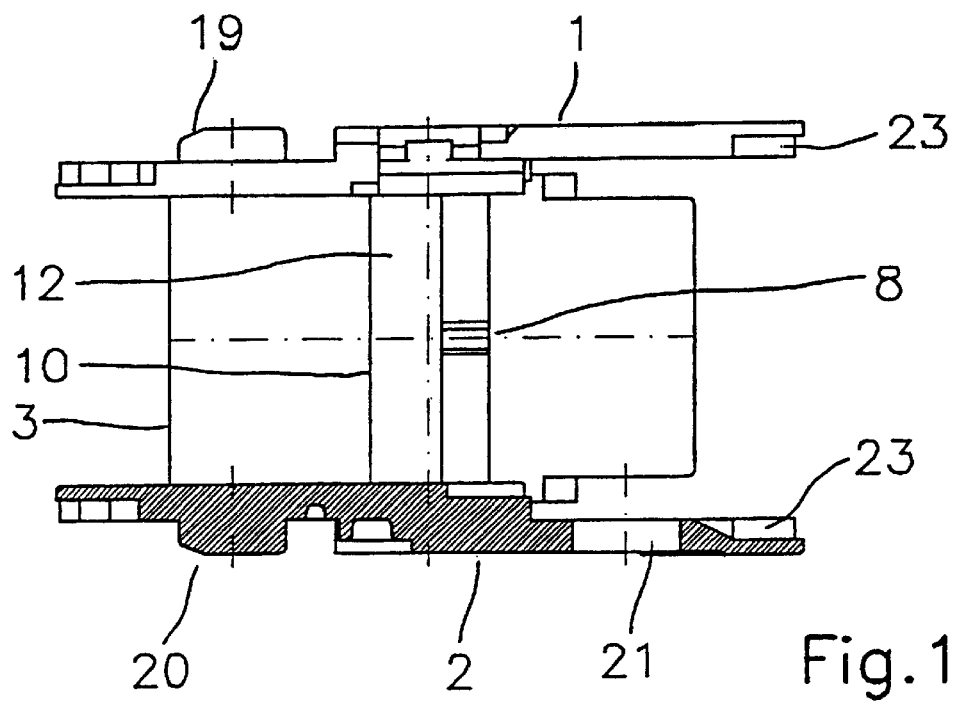
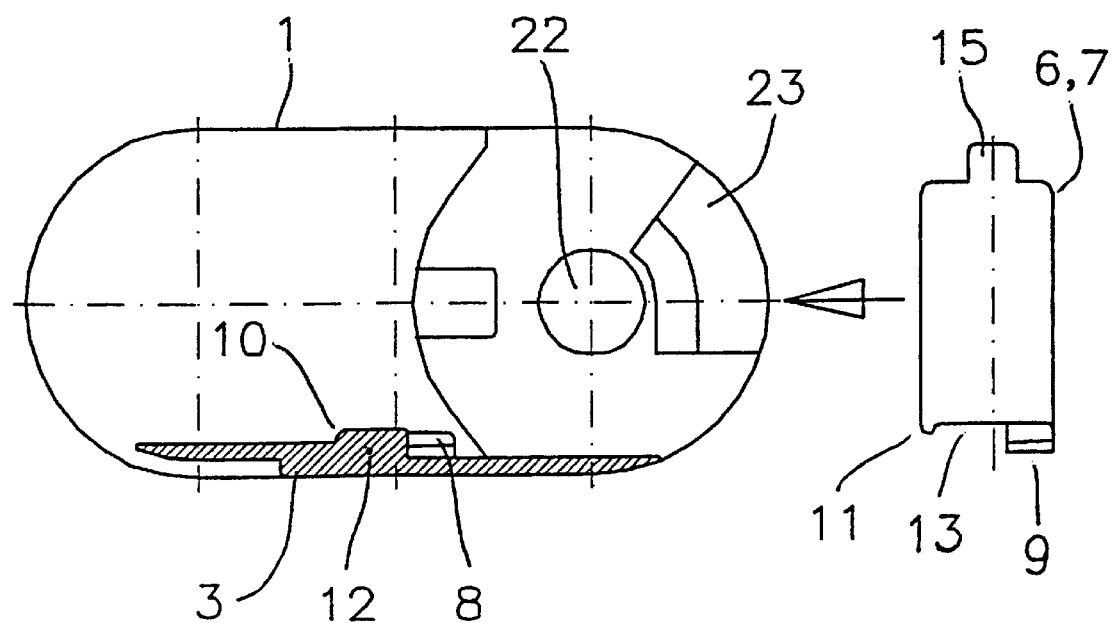
Fig.1
Fig.2
Fig.3

CHAIN LINK WITH INSERTABLE PARTITIONS

BACKGROUND OF THE INVENTION

The subject matter of the invention relates to a chain link, in particular a chain link of an energy supply line guiding chain with insertable partitions dividing the central guide channel thereof.

Supply lines that lead to a movable consumer are laid in so-called energy supply line guiding chains. The energy supply line guiding chain connects with its one end to a fixed point and with its other end to the movable consumer. The energy supply line guiding chain is constructed from flexibly interconnected chain links. A chain link comprises a receiving chamber. The receiving chambers of the individual chain links form a central guide channel, in which the supply lines can be laid. Two spaced-apart, oppositely arranged chain side plates, as well as a cross plate and a cover define the receiving chamber. The plate and the cover connect to each chain side plate.

To avoid damage to the supply lines, that can be laid in the channel of the energy supply line guiding chain, it is known to subdivide the cross section of the channel and thus likewise of the receiving chamber of each chain link. Utility Model G 91 02 121.9 discloses an energy supply line guiding chain for running supply lines from a stationary terminal to a movable consumer, wherein the receiving chamber of the chain side plates is subdivided by partitions and crossbars. Each partition is arranged between two spaced-apart, oppositely positioned covers. To secure each partition to the cover, each partition comprises at its upper and lower ends a U-shaped holder that surrounds the cover. Furthermore, between the legs of the U-shaped holder, each partition comprises a pin that engages a corresponding bore of the covers, so that the partition is unable to slide in the axial direction of the covers. The cover is made as a separate component of the chain link.

DE 37 09 953 C2 discloses a further embodiment of a chain link with partitions and separating crossbars for subdividing the receiving chamber. This embodiment requires additional components, which secure the partitions to the covers. Thus, for example, an additional partition without U-shaped ends is needed, which comprises a press rib that engages a press groove of a chain side plate. Such a partition is needed for each chain side plate, so that the partitions arranged in the center region of the chain side plates are secured by the crossbars arranged between the partitions and connected to same.

Furthermore, a U-shaped chain link is known, which comprises chain side plates that are interconnected by a plate. To subdivide the receiving chamber formed by the chain link, partitions are provided that can be inserted into recesses formed in the plate.

Based on an foregoing, it is the object of the present invention to provide a chain link that facilitates subdividing the receiving chamber. In this connection, the chain link is to be produced at a favorable cost. A further object of the invention is to describe a simplest possible possibility of securing a partition in its position in a chain link. A further object of the invention it to describe an energy supply line guiding chain, that can be produced at a favorable cost.

SUMMARY OF THE INVENTION

The above and other objects and advantages of the present invention are achieved by the provision of a guide chain which is composed of a plurality of pivotably interconnected chain links, and wherein each link comprises two spaced apart and parallel side plates which define a longitudinal direction along the length thereof, and a cross plate or member interconnecting the two side plates so as to form a unitary U-shaped receiving member which defines a central guide channel for the energy conducting lines. The U-shaped receiving member may be molded.

In the chain link of the present invention, the chain side plates and the plate form a one-piece structural element. The chain side plates and the plate are produced in one operation. This accomplishes a more economical production of the chain side plates and the plate. The plastic chain link of the present invention distinguishes itself in that the plate comprises at least one profiled groove extending substantially parallel to a chain side plate, and that the partition has on at least one end section at least one engaging member shaped to correspond with the profiled groove, the engaging member being insertable into the profiled groove in the axial direction of the chain side plate. The profiled groove in the plate and the engaging member on the partition accomplish a formfitting connection between the partition and the plate. The production of such a chain link is substantially simplified, since the configuration of the chain side plates and the plate as well as of the profiled groove permit a simpler design of the required die, because unmolding of the structural part in the extrusion die is simplified. To unmold the structural part it will suffice to bring up the extrusion die in two planes.

Due to the configuration of the profiled groove and the engaging member, the plastic chain link of the present invention does not require a displacement of the partition transverse of the longitudinal extent of the chain side plates, so that additional components as are needed in the prior art may be omitted.

For a formfitting connection of the partition to the plate, it is proposed to make the profiled groove with a T-shaped or dovetail-shaped cross section. The engaging member has a cross section corresponding to that of the profiled groove.

To simplify the insertion of the engaging member into the profiled groove, it is proposed to narrow the profiled groove and engaging member in their longitudinal directions. This configuration also accomplishes that the partition assumes a defined position inside the receiving chamber. The corresponding configuration of the narrowing profiled groove and engaging member accomplishes a frictionally engaging connection of the partition to the plate. Preferably, the profiled groove and engaging member are made conical.

According to a further, advantageous concept it is proposed to provide the profiled groove in a medial portion of the longitudinal direction of the chain side plates. The plate comprises a raised portion that preferably extends substantially crosswise to the axial direction of the chain side plates. In this raised portion, the profiled groove is formed. This configuration realizes a savings in material when shaping the chain link, since the plate may have only a minimally necessary thickness. Preferably, the raised portion is molded to the plate, in particular, the plate with the raised portion is made in one piece.

According to a further advantageous configuration of the chain link, it is proposed to extend the profiled groove only over part of the length of the plate or the raised portion. To secure the partition, it will suffice that the engaging member extends only over a part of the width of the partition. Preferably, the engaging member is at most as long as the profiled groove.

During the operation of an energy supply line guiding chain that is formed by chain links, shocks and vibrations of the energy supply line guiding chain may cause the partition to separate from the plate. To avoid this, it is proposed to provide the plate with a shoulder substantially extending transversely to the longitudinal direction of the chain side plate, and the partition with a depending projection in spaced relation to its engaging member. This projection can be brought in contact with the shoulder. As a result of combining the shoulder and projection, the partition is locked in its position, so that it does not separate from the plate even by vibrations or shocks. Preferably, the shoulder is formed by the raised portion, thereby maintaining an economical production of the chain link.

According to a further, advantageous concept, it is proposed to adapt the section of the partition, which extends between the engaging member and the projection, for contacting the raised portion. This configuration realizes a large-surface force introduction from the partition into the raised portion or plate. Thus, the partition is also suitable for receiving crossbars, thereby facilitating a further subdivision of the receiving chamber.

In practice, it is common to arrange energy supply line guiding chains in such a manner that the chain side plates extend substantially vertically to a support for the energy supply line guiding chain. With the use of an arrangement of the energy supply line guiding chain rotated by 90°, the chain side plates are located in a plane substantially parallel to the support. To ensure that the chain link of the present invention can also be used for such an arrangement of the energy supply line guiding chain, it is proposed to provide the cover with receptacles, into which an end section of the partition opposite to the engaging member extends at least in part. Because of this configuration, each partition is supported with its one end on the cover and with its other end on the plate. Preferably, the cover comprises a number of receptacles corresponding to the profiled grooves. This is not absolutely needed. Preferred is a cover that has a larger number of receptacles than the number of profiled grooves. This permits using a cover for chain links with a different number of profiled grooves. It is understood that in the installed state of the cover, the receptacles extend above the profiled grooves in alignment therewith.

Preferably, the receptacle is formed by at least two opposite, spaced-apart longitudinal ribs that extend in the longitudinal direction of the chain side plates. Each receptacle is formed in addition by two opposite, spaced-apart transverse ribs that extend in the longitudinal direction of the chain side plates. This configuration of the receptacles imparts to the cover a high inherent stiffness, so that the cover undergoes no flexing even in a state of stress. Preferably, the cover of the chain link is formed such that the transverse ribs are provided for all receptacles, with the longitudinal ribs being formed between the transverse ribs.

A further, advantageous concept proposes to make the plate and the cover in the shape of an enclosure, so that the receiving chamber is protected against outside influences.

A further inventive concept proposes an energy supply line guiding chain with flexibly interconnected chain links, wherein at least one chain link of the energy supply line guiding chain is constructed according to the present invention.

BRIEF DESCRIPTION OF THE DRAWINGS

Further details and advantages of a chain link as well as of an energy supply line guiding chain are described in more detail with reference to embodiments illustrated in the drawing, in which:

FIG. 1 is top view of a chain link which embodies the present invention;

FIG. 2 is a sectional front view of the chain link;

FIG. 3 shows a partition;

DETAILED DESCRIPTION OF THE PREFERRED EMBODIMENT

Figure 4:
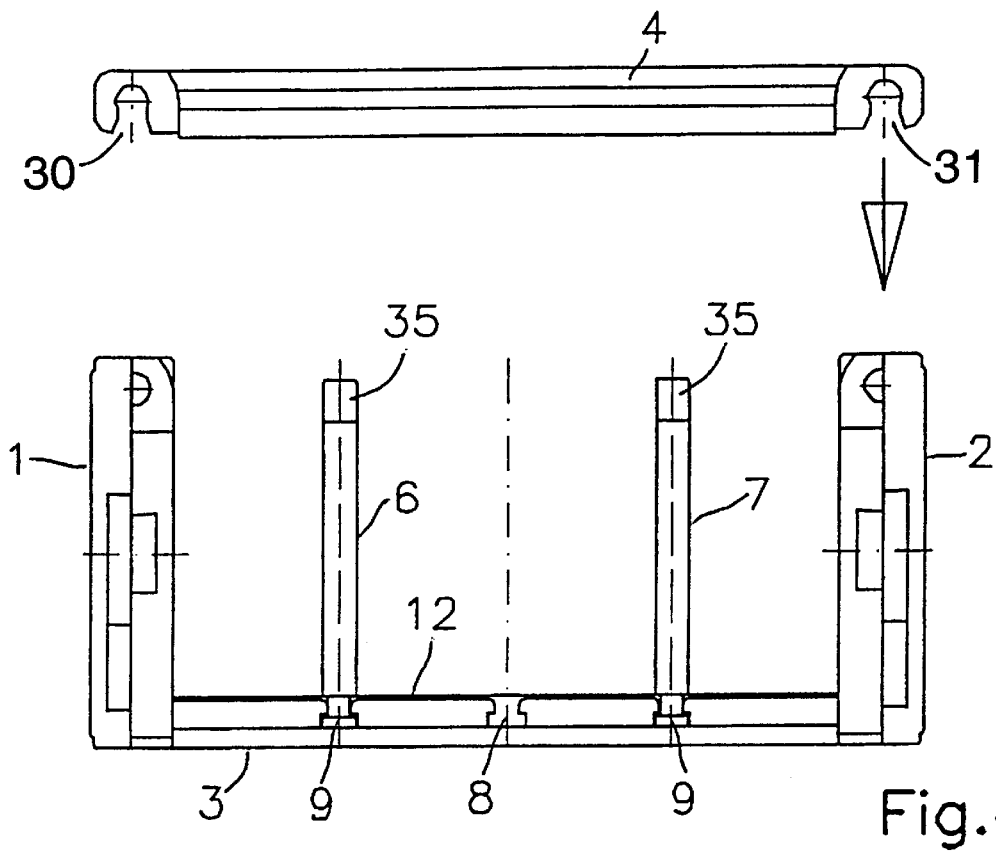
FIG. 4 is a side view of the chain link with partitions and a cover.

FIG. 1 is partially sectioned top view of an embodiment of a chain link made of plastic. The chain link comprises two spaced-apart, oppositely extending chain side plates 1, 2. The chain side plates 1, 2 are connected to a cross member or plate 3. The chain side plates 1, 2, and plate 3 form a substantially U-shaped chain link. The chain side plate 1 comprises a joint pin 19 in its one end region and on the surface facing away from chain side plate 2. In the end region opposite to the joint pin 19, a joint bore 22 is formed. The joint bore 22 is configured such that a joint pin 19 of an adjacent chain link is able to swivel in joint bore 22. To define an angle of horizontal swing of adjacent chain links, each chain side plate 1, 2 comprises a recess 23 that is formed in the region of joint bore 22 or 21 of chain side plate 2. The chain side plate 2 is constructed in accordance with the chain side plate 1 and comprises a joint pin 20 as well as joint bore 21.

Figure 5:
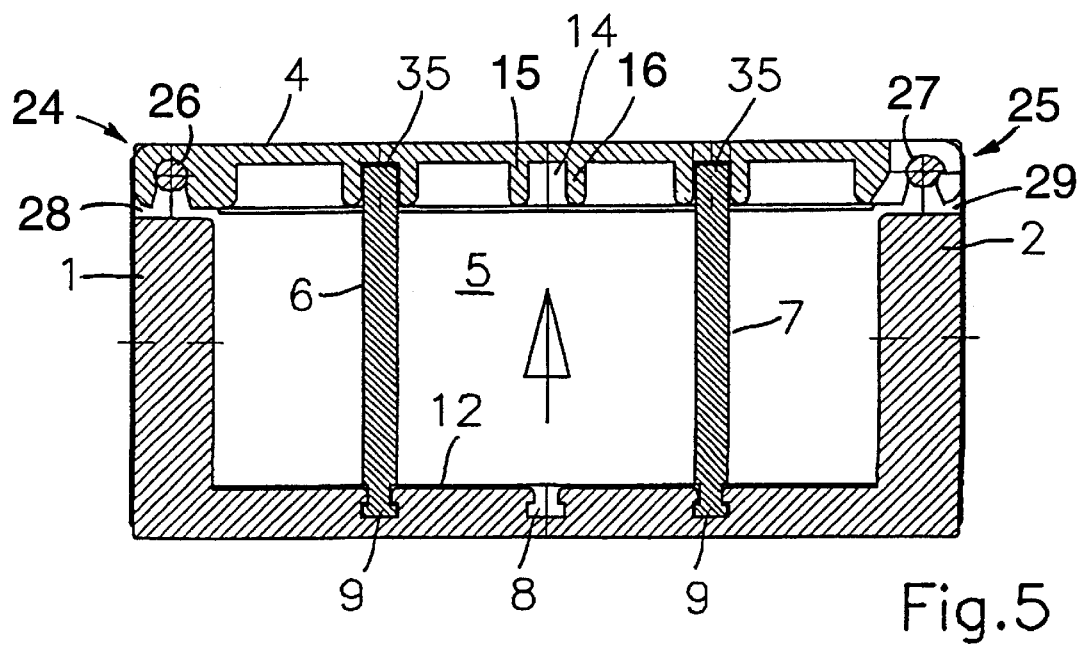
FIG. 5 is a side view of the chain link with the cover mounted.
Figure 7:
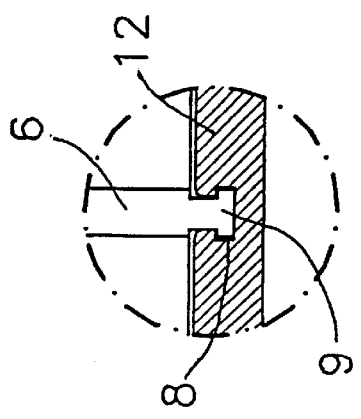
FIG. 7 is an enlarged, sectional side view of a profiled groove in the plate and a partition.

The plate 3 comprises a profiled groove 8, which extends substantially parallel to the chain side plates 1, 2. In the illustrated embodiment, the profiled groove 8 has a substantially T-shaped cross section, as best seen in FIG. 7. In FIG. 1, only one profiled groove 8 is formed in plate 3. As can be noted from FIG. 4 or 5, the plate 3 may comprise several profiled grooves 8. The number of profiled grooves 8 is dependent substantially on the profile required from a chain link.

The profiled groove 8 serves to secure a partition 6, 7 as shown in FIG. 3. The partition 6, 7 has in one end section an engaging member 9 of a cross section corresponding to the profiled groove 8. The cross section of engaging member 9 is substantially T-shaped, as best seen in FIG. 7. In the illustrated embodiment, the partition 6, 7 has an engaging member that extends only over a part of the width of partition 6. The partial width of engaging member 9 corresponds substantially to the length of profiled groove 8. At a distance from engaging member 9, the partition is provided with a projection 11.

Figure 6:
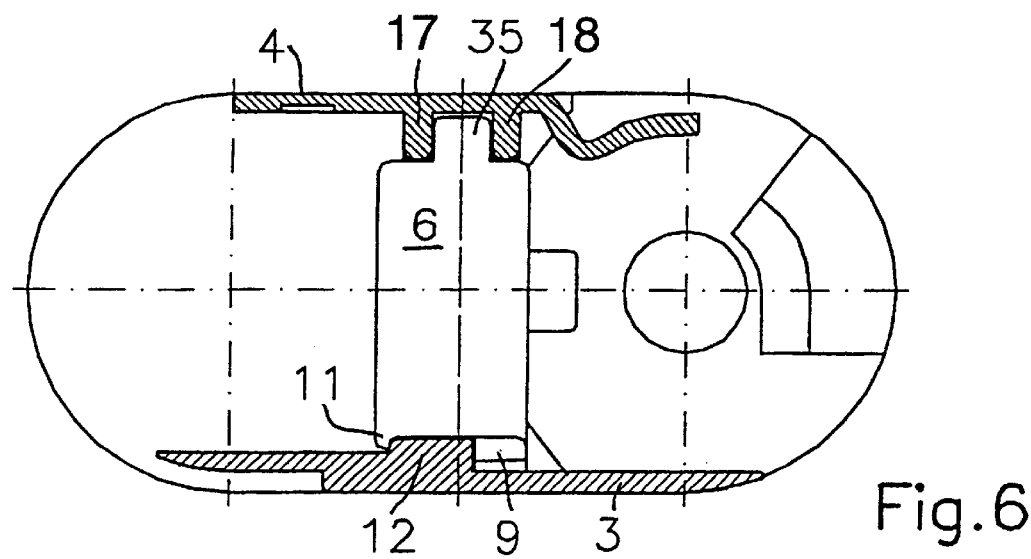
FIG. 6 is a sectional front view of the chain link with partition and cover.

The partition 6, 7 is adapted for insertion into profiled groove 8. FIG. 6 shows the partition 6 connected to the plate 3. The engaging member 9 of the partition 6 is secured in profiled groove 8. The projection 11 of partition 6 rests against a shoulder 10. The shoulder 10 is formed on plate 3. The shoulder 10 extends substantially transversely to the longitudinal direction of the chain links, as best seen in FIG. 1. The shoulder 10 is formed by a transversely extending edge of the raised portion 12. The raised portion 12 is made in one piece with plate 3. Preferably, it extends over the entire width of plate 3.

Between engaging member 9 and projection 11 of partition 6, a section 13 extends that lies against raised portion 12 in the installed condition of partition 6.

In the illustrated embodiment, the profiled groove 8 and engaging member 9 narrow in the longitudinal direction. Preferably, the profiled groove 8 and engaging member 9 are made conical.

In the illustrated embodiment, a cover 4 is releasably connected to the chain side plate 1 and 2 by means of a hingelike joint 24, 25. Each chain side plate comprises a joint pin 26, 27, which is formed in an undercut 28, 29 of chain side plate 1 and 2, respectively.

The cover-shaped cover 4 has two receptacles 30, 31 for releasably receiving the pins 26, 27 respectively. The cover 4 can be totally released from chain side plates 1, 2, or only from side plate 1 or 2, and subsequently be swiveled about joint pin 26 or 27.

The cover 4 comprises three receptacles 14, which are each engaged by at least by one end section 35 of partition 6, 7, which extends opposite to engaging member 9. The end section 35 of partition 6, 7 is made in the form of a tab. Each receptacle 14 is formed by two-spaced apart, oppositely arranged longitudinal ribs 16, 17 that extend in the longitudinal direction of chain side plates 1, 2. In the illustrated embodiment each receptacle 14 is defined by two spaced-apart, oppositely arranged transverse ribs 18, 19 that extend crosswise to the longitudinal direction of the chain side plates 1, 2. The transverse ribs 18, 19 are provided for all receptacles 14, with the longitudinal ribs 16, 17 being formed between transverse ribs 18, 19, as best seen in FIG. 11.

Figure 9:
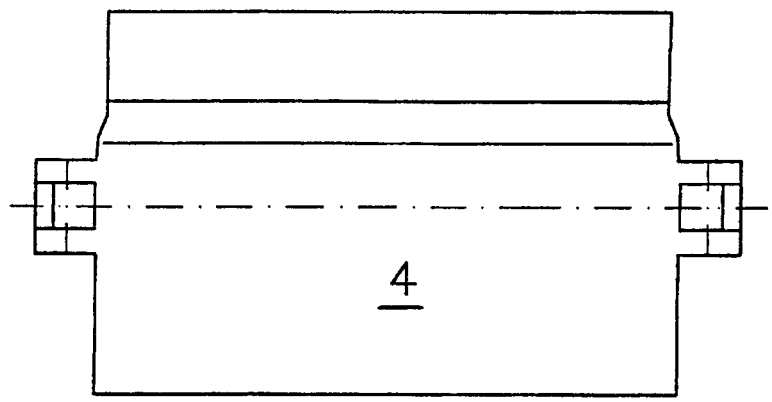
FIG. 9 is a top view of a cover made as a cover.
Figure 10:
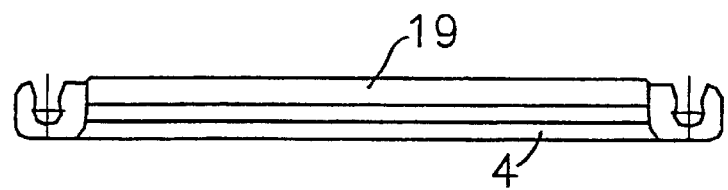
FIG. 10 is a front view of the cover.
Figure 11:
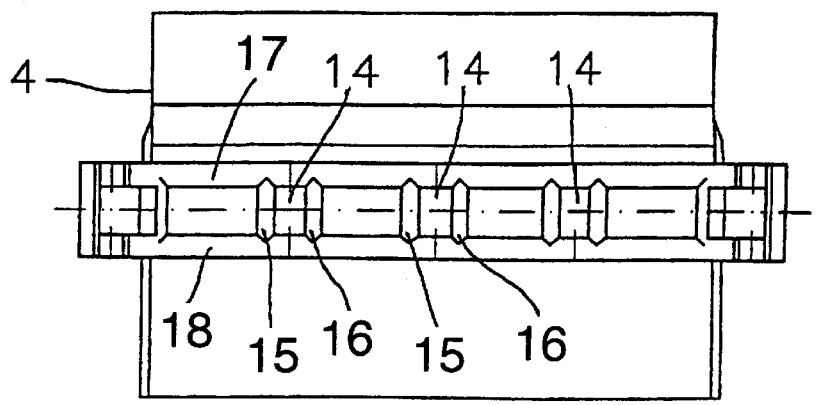
FIG. 11 is a bottom view of the cover.
Figure 8:
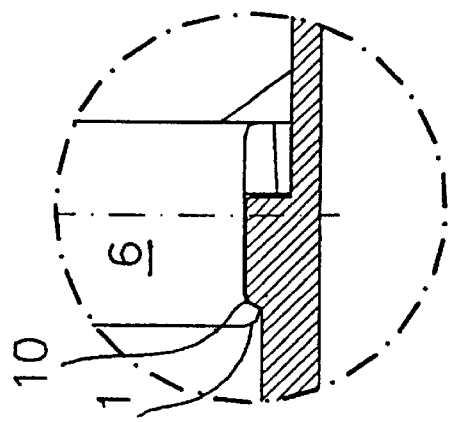
FIG. 8 is an enlarged, sectional front view of a partition.
Figure 12:
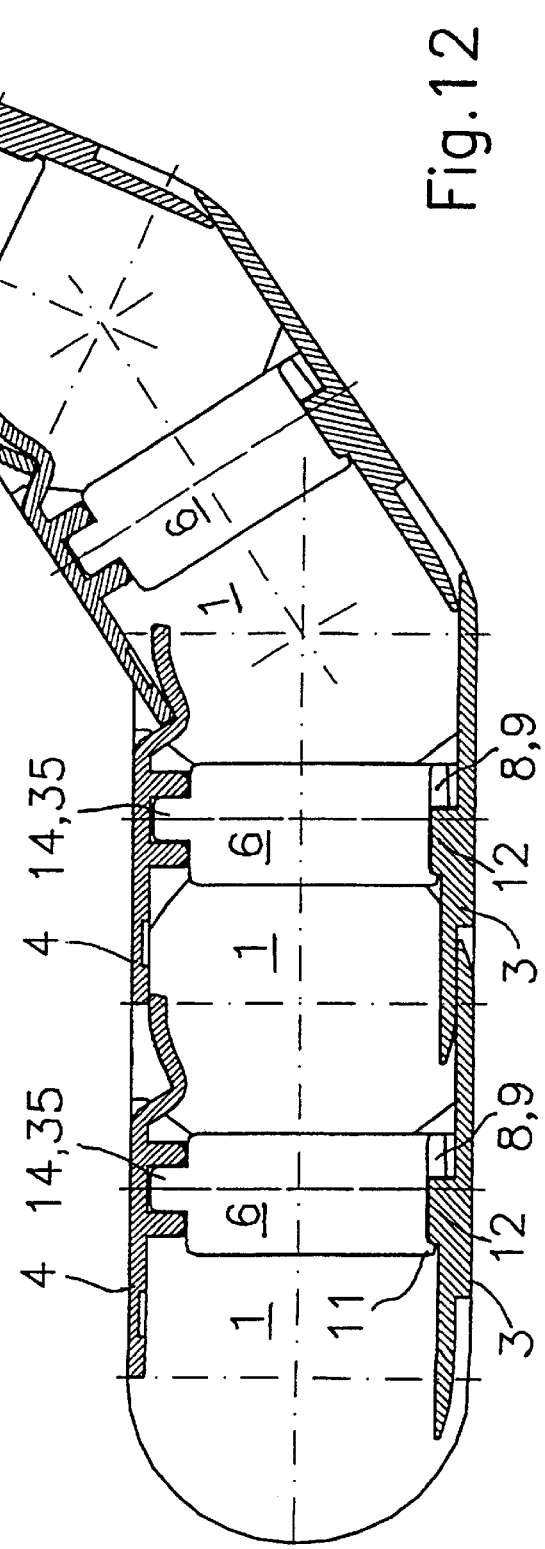
FIG. 12 is an axially sectioned view of a segment of an energy supply line guiding chain.

The cover shown in FIGS. 9–11 is made essentially in the form of an enclosure. This also applies to the plate 3. When a plurality of chain links are joined to an energy supply line guiding chain, as shown in FIG. 12, the receiving channel of the energy supply line guiding chain is substantially enclosed. The partitions 6, 7 subdivide a receiving chamber 5 of the energy supply line guiding chain in the longitudinal direction. It is also possible to subdivide the receiving chamber 5 in the transverse direction. To this end, the partitions may be interconnected by crossbars not shown.

What is claimed is:

1. A chain link for an energy conducting guide chain comprising two spaced apart and parallel side plates which define a longitudinal direction along the length thereof, at least one cross member extending transversely between and interconnecting the side plates, said cross member having an upper surface which includes a transversely extending shoulder and at least one profiled groove extending longitudinally along a portion of the longitudinal width of the cross member and terminating short of the shoulder, and a partition mounted between the side plates and having a bottom edge which includes an engaging member which is configured so as to correspond with the profiled groove and so as to be slideably received in said groove in the longitudinal direction, and a depending projection which is longitudinally spaced from said engaging member so as to engage said shoulder.

2. The chain link as defined in claim 1 wherein the groove has a T-shaped cross section, and wherein the engaging member of the partition has a corresponding cross section.

3. The chain link as defined in claim 1 wherein the groove and the engaging member of the partition have cross sections which narrow in the longitudinal direction toward the shoulder.

4. The chain link as defined in claim 1 wherein the groove is positioned in a medial portion of the longitudinal extent of the side plates.

5. The chain link as defined in claim 1 wherein the one cross member includes a relatively thin plate portion and a relatively thick raised portion, with the raised portion having opposite transverse edges, and wherein the groove is formed in the raised portion so as to communicate with an edge which is adjacent the plate portion and the shoulder is formed by the other edge of the raised portion.

6. The chain link as defined in claim 5 wherein the plate portion and the raised portion of the cross member are integrally molded.

7. The chain link as defined in claim 5 wherein the longitudinal length of the engaging member of the partition is not greater than the longitudinal length of the groove.

8. The chain link as defined in claim 5 wherein the partition includes an edge surface between the engaging member and the projection which rests against the raised portion of the cross member.

9. The chain link as defined in claim 1 further comprising a cover releasably connected to the side plates, so that the two side plates, the one cross member, and the cover form an enclosure, with the enclosure being subdivided by said partition.

10. The chain link as defined in claim 9 wherein the cover includes at least one receptacle facing the one cross member, and wherein the partition includes an upper edge having a tab which is received in said one receptacle.

11. The chain link as defined in claim 10 wherein the one receptacle is formed by two transversely spaced apart longitudinal ribs.

12. The chain link as defined in claim 11 wherein the one receptacle is further formed by two longitudinally spaced apart transverse ribs.

13. The chain link as defined in claim 1 wherein the two side plates and the one cross member are integrally molded in one piece of a plastic material.

14. A guide chain for supporting one or more energy conducting lines from a fixed connection to a movable consuming device, comprising a plurality of chain links, with each of the chain links comprising two spaced apart and parallel side plates which define a longitudinal direction along the length thereof, and a cross member extending transversely between and interconnecting the side plates, said cross member having an upper surface which includes a transversely extending shoulder and at least one profiled groove extending longitudinally along a portion of the longitudinal width of the cross member and terminating short of the shoulder, and a partition mounted between the side plates and having a bottom edge which includes an engaging member which is configured so as to correspond with the profiled groove and so as to be slideably received in said groove in the longitudinal direction, and a depending projection which is longitudinally spaced from said engaging member so as to engage said shoulder, said chain links being serially arranged with adjacent chain links and being pivotably connected to each other.

15. The guide chain as defined in claim 14 wherein the groove has a T-shaped cross section, and wherein the engaging member of the partition has a corresponding cross section.

16. The guide chain as defined in claim 14 wherein the one cross member includes a relatively thin plate portion and a relatively thick raised portion, with the raised portion having opposite transverse edges, and wherein the groove is formed in the raised portion so as to communicate with an edge which is adjacent the plate portion and the shoulder is formed by the other edge of the raised portion.

17. The guide chain as defined in claim 14 further comprising a cover releasably connected to the side plates of each chain link, so that the two side plates, the one cross member, and the cover form an enclosure, with the enclosure being subdivided by said partition.

18. The guide chain as defined in claim 17 wherein the cover of each chain link includes at least one receptacle facing the one cross member, and wherein the partition includes an upper edge having a tab which is received in said one receptacle.

* * * * *